US008067935B2

(12) United States Patent
Burrows

(10) Patent No.: US 8,067,935 B2
(45) Date of Patent: Nov. 29, 2011

(54) SYSTEM FOR SENSING THE OPENING AND CLOSING OF A PHARMACEUTICAL CONTAINER

(76) Inventor: Mark D. Burrows, Princeton, NJ (US)

( * ) Notice: Subject to any disclaimer, the term of this patent is extended or adjusted under 35 U.S.C. 154(b) by 772 days.

(21) Appl. No.: 12/146,416

(22) Filed: Jun. 25, 2008

(65) Prior Publication Data

US 2009/0015245 A1 Jan. 15, 2009

Related U.S. Application Data

(60) Provisional application No. 60/948,532, filed on Jul. 9, 2007.

(51) Int. Cl.

*G01N 7/14* (2006.01)
*B65D 83/04* (2006.01)
*G04B 47/00* (2006.01)

(52) U.S. Cl. ..................... 324/207.2; 215/230; 206/534; 368/10

(58) Field of Classification Search ........................ None
See application file for complete search history.

(56) References Cited

U.S. PATENT DOCUMENTS 4,419,016 A * 12/1983 Zoltan ............................ 368/10
4,434,903 A * 3/1984 Cooke ........................... 215/222
4,739,890 A * 4/1988 Cooke ........................... 215/222
5,313,439 A * 5/1994 Albeck ........................... 368/10
6,271,753 B1 * 8/2001 Shukla ........................ 340/545.6
6,604,650 B2 * 8/2003 Sagar ................................ 221/3
7,554,434 B1 * 6/2009 Gifford et al. ........... 340/309.16
2002/0104848 A1 8/2002 Burrows et al.
2007/0097792 A1 5/2007 Burrows et al.

* cited by examiner

*Primary Examiner* — Jay Patidar
(74) *Attorney, Agent, or Firm* — Ward and Smith, P.A.

(57) ABSTRACT

Multiple embodiments of mechanisms for sensing the opening and closing of pharmaceutical containers are disclosed. In particular, the example sensing mechanisms of the invention trigger an automatic, built-in, electronic dosage reminder and open/close event logging operation while requiring no additional actions or otherwise changed behavior by the patient, in order to increase patient compliance with dosing regimens. Furthermore, certain embodiments of the sensing mechanisms are reliable and sufficiently low cost to be practical for use in commercial product applications. In one embodiment, the sensing mechanism includes two electrical conductors that have no electrical connection therebetween when the closure is not present on the container and a bridge conductor in the closure that provides an electrical connection therebetween when the closure is tightened onto the container. In this example embodiment, the state of the two electrical conductors may be monitored in order to sense a container opening and closing event.

10 Claims, 5 Drawing Sheets

SYSTEM FOR SENSING THE OPENING AND CLOSING OF A PHARMACEUTICAL CONTAINER

CROSS-REFERENCE TO RELATED APPLICATIONS

This application claims the benefit of, and expressly incorporates herein by reference, the entire disclosure of U.S. provisional patent application Ser. No. 60/948,532, entitled MECHANISMS FOR SENSING THE OPENING AND CLOSING OF PHARMACEUTICAL CONTAINERS, filed Jul. 9, 2007.

FIELD OF THE INVENTION

The present invention generally relates to the field of pharmaceutical containers. In particular, the present invention is directed to mechanisms for sensing the opening and closing of pharmaceutical containers.

BACKGROUND

Outpatient prescription medication treatments are relied upon heavily for increased quality of life and lower lifetime healthcare costs. Medical experts have long held that taking at least 80% of a prescribed drug is required to achieve desired therapeutic outcomes and lower lifetime healthcare costs. For example, a patient who faithfully takes cholesterol-reducing medicine significantly reduces the likelihood of a coronary event that has attendant cost-intensive medical procedures and diminished quality of life. Outpatients strongly desire to avoid such events and hospital stays, yet only 20% of all outpatients take their prescription medicines according to doctor's instructions.

Pharmaceutical manufacturers also stand to gain from increased outpatient medication compliance in the form of increased medication sales. Accordingly, these manufacturers are actively investing in and testing compliance-increase techniques. A marketing executive at one major pharmaceutical company said that his market research has documented that patients want to comply, but will not take on the burden of any additional actions or otherwise change behavior.

For these reasons, a need exists for reminder mechanisms for increasing patient compliance with dosing regimens. In particular, a need exists for reminder mechanisms that place little or no burden on the patient and that are sufficiently low cost to be practical for use in commercial product applications.

BRIEF SUMMARY OF THE INVENTION

The present invention is a system for sensing the opening and closing of a pharmaceutical container. The system includes a pharmaceutical container, the pharmaceutical container further including a container body, a container neck disposed at one end of the container body, container threads disposed on the container neck, a rim disposed between the container threads and the container body, a container closure removably attached to the container neck via the container threads, control circuitry integrated within the container body, indicators integrated within the container body and an automatic sensing mechanism integrated within the pharmaceutical container body.

In one embodiment the automatic sensing mechanism, includes a first conductor disposed along the outside of the container body, a second conductor disposed along the outside of the container body, and a bridge conductor disposed on the inside of the container closure. The bridge conductor provides an electrical connection between the first conductor and second conductor when the container closure is attached to the container neck, and wherein the first conductor, second conductor, and bridge conductor provide a switch function for sensing the presence or absence of the container closure by detecting when an electrical connection exists or not between the first conductor and second conductor via the bridge conductor.

In another embodiment the automatic sensing mechanism includes a first conductor disposed along the outside of the container body, a second conductor disposed along the outside of the container body, and a micro-switch integrated into the container neck between the first conductor and the second conductor. The location of the micro-switch on the container neck is such that when the container closure is tightened upon the container neck a thread of the container closure makes physical contact with an actuator of the micro-switch to close the micro-switch thus providing an electrical connection between the first conductor and second conductor when the container closure is attached to the container neck, and wherein the first conductor, second conductor, and micro-switch provide a switch function for sensing the presence or absence of the container closure by detecting when an electrical connection exists or not between the first conductor and second conductor via the micro-switch.

In yet another embodiment the automatic sensing mechanism includes a first conductor disposed along the outside of the container body, a second conductor disposed along the outside of the container body, and a compression region formed by flexible insulator materials that are abutted one to another and disposed between the first conductor and second conductor. The placement of the flexible insulator material is in alignment with one or more threads of the container closure when the container closure is tightened upon the container neck, and wherein when the container closure is tightened upon the container, its threads apply pressure to the compression region which displaces the flexible insulator material where they abut one another thus causing the first conductor to flex toward the second conductor and make electrical contact thereto, forming a switch function for sensing the presence or absence of the container closure by detecting when an electrical connection exists or not between the first conductor and second conductor.

In yet another embodiment the automatic sensing mechanism includes a Hall effect sensor disposed on the outside of the container body, and a magnet disposed on an edge of the container closure such that it is in close proximity to the Hall effect sensor when the container closure is tightened to the closed position. An output voltage of the Hall effect sensor is at certain states based on the presence or absence of a magnetic field generated from the magnet and thus detects the presence or absence of container closure, thus providing a switch function for sensing the presence or absence of the container closure by detecting when a magnetic field is present or absent.

The present invention further provides a method of sensing the opening and closing of a pharmaceutical container. The method includes providing a pharmaceutical container having an automatic sensing mechanism, sensing the opening and/or closing of the pharmaceutical container, triggering the automatic sensing mechanism to automatically generate a dosage reminder signaling a user at dose time via the control circuitry and indicators which are actuated by opening and re-closing of the pharmaceutical container, and tracking container usage and dosage compliance.

DETAILED DESCRIPTION

The present invention is multiple embodiments of mechanisms for sensing the opening and closing of a container, such as, but not limited to, a pharmaceutical container. In particular, the sensing mechanisms trigger an automatic, built-in, electronic dosage reminder and open/close event logging operation while requiring no additional actions or otherwise changed behavior by the patient, in order to increase patient compliance with dosing regimens. Furthermore, certain embodiments of the sensing mechanisms are reliable and are sufficiently low cost to be practical for use in commercial product applications.

Figure 1A:
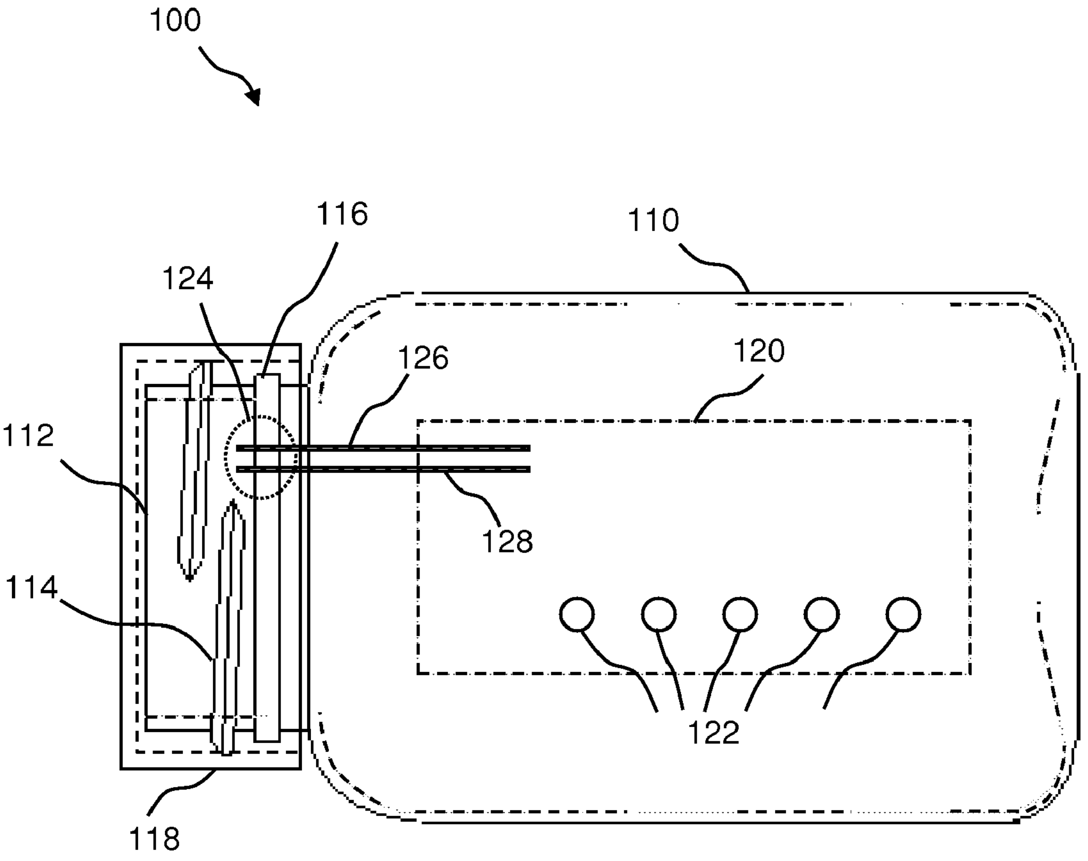
FIG. 1A illustrates a side view of a pharmaceutical container that includes an example of a mechanism for sensing the opening and closing thereof, which triggers an automatic, built-in, electronic dosage reminder operation.

FIG. 1A illustrates a side view of a pharmaceutical container 100 that includes an example of a mechanism for sensing the opening and closing thereof, which triggers an automatic, built-in, electronic reminder operation. Container 100 is, for example, a pharmaceutical container that contains active and passive electrical components for coupling to the sensing mechanism and providing a response thereto. For example, container 100 includes a hollow container body 110 for containing, for example, a quantity of pills, capsules, caplets, and the like, which are prescribed to a patient (not shown) according to a certain dosing regimen. Container 100 also includes a container neck 112 at one end of container body 110 that has container threads 114 and a rim 116 that is disposed between container threads 114 and container body 110, as shown in FIG. 1. Container neck 112 provides an opening by which the contents of container body 110 is accessed. Furthermore, container neck 112 accommodates a closure 118, which may be a screw-type cap that includes threads (not shown) that correspond to container threads 114 for rotatably securing closure 118. Container body 110, container neck 112, container threads 114, rim 116, and closure 118 may be formed of any suitably rigid, lightweight, and food-safe material, such as molded plastic high-density polyethylene (HDPE).

Additionally, integrated within container body 110 of container 100 are control circuitry 120, a set of indicators 122, and an example sensing mechanism 124 of the invention. Sensor circuitry 120 may be installed in a well (not shown) that is provided in the outside of container body 110, such that there is no contact with the contents inside of container body 110.

Control circuitry 120 is the electronics for providing the overall control of the automatic, built-in reminder functions of container 100. For example, control circuitry 120 may include a control means and storage means for managing a dosing reminder operation that corresponds to the patient's prescribed dosing regimen. In one example, the patient's prescribed dosing regimen is one dose every 24 hours. In another example, the patient's prescribed dosing regimen is two doses daily. In yet another example, the patient's prescribed dosing regimen is three doses daily.

Additionally, control circuitry 120 monitors the state of sensing mechanism 124, which is an indicator of whether the patient has consumed a dose of the contents of container 100. More specifically, control circuitry 120 senses an opening and closing event by sensing the removal and replacement of closure 118 by use of sensing mechanism 124. In response to the state of sensing mechanism 124, control circuitry 120 determines the state of indicators 122, which may be standard light-emitting diode (LED) devices. In one example, a first indicator 124 is a "close container" LED for prompting the user to install closure 118 upon container 100, a second indicator 124 is a "status ok" LED for indicating that the current state of the dosing regimen is satisfactory, a third indicator 124 is a "missed dose" LED for indicating to the user that a dose has been missed, and a fourth indicator 124 is a "take prescribed dose" LED for indicating to the user that it is time to consume his/her prescribed dose of medication.

Sensing mechanism 124 is formed of a first conductor 126 and a second conductor 128 that are disposed along the outside of container 100, such that one end of the conductor pair is electrically connected to control circuitry 120 and the opposite end of the conductor pair is disposed at container neck 112. More details of sensing mechanism 124 are described in FIG. 1B.

Figure 1B:
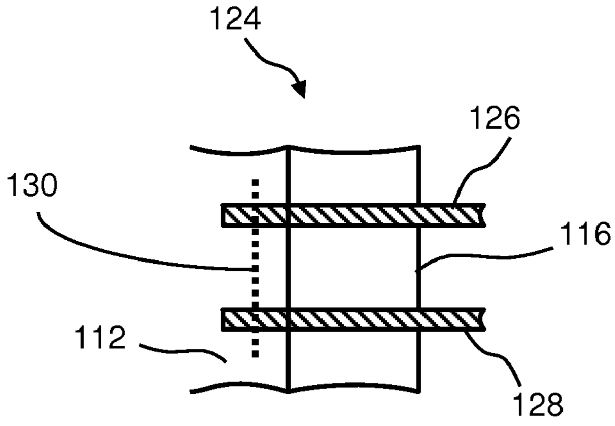
FIG. 1B illustrates a close up side view of the example sensing mechanism of FIG. 1A.

FIG. 1B illustrates a close up side view of the example sensing mechanism 124 of FIG. 1A. First conductor 126 and second conductor 128 may be formed of any food-safe, electrically conductive material. In one example, first conductor 126 and second conductor 128 may be formed of non-toxic, electrically conductive ink, available widely from sources such as Creative Materials, in Tyngsboro, Mass. (www.creativematerials.com). In another example, first conductor 126 and second conductor 128 may be formed of non-toxic, electrically conductive metal, such as copper. Optionally, the color of first conductor 126 and second conductor 128 may be the same as the color of container 100, in order to be inconspicuous such that the user is not prone to tampering therewith. The thickness of first conductor 126 and second conductor 128 may be a few microns. First conductor 126 and second conductor 128 may be spaced anywhere along the perimeter of container neck 112, e.g., from few microns to about half the circumference of container neck 112.

FIG. 1B shows one end of first conductor 126 and second conductor 128 at container neck 112 and near rim 116. A bridge conductor 130 is provided on the inside of closure 118, such as along a thread (not shown) of closure 118. Bridge conductor 130 may be formed of any non-toxic, electrically conductive material. In one example, bridge conductor 130 may be formed of non-toxic, electrically conductive ink, widely available from suppliers such as Creative Materials, in Tyngsboro, Mass. (www.creativematerials.com). In another example, bridge conductor 130 may be formed of non-toxic, electrically conductive metal, such as copper. The contact point of bridge conductor 130 along first conductor 126 and second conductor 128 is not critical.

The combination of first conductor 126 and second conductor 128 and bridge conductor 130 provide a switch function for sensing the presence or absence of closure 118 and, thereby, sense an opening/closing event. More specifically, control circuitry 120 may detect when an electrical connection exists or not between first conductor 126 and second conductor 128 via bridge conductor 130. This may be accomplished by use of well-known analog or digital circuit elements (not shown) of control circuitry 120. In one example, first conductor 126 may be connected to about ground (i.e., about 0 volts) and second conductor 128 may be connected to a pull-up resistor to a voltage, such as to about 1 volts. Consequently, when there is no electrical connection between first conductor 126 and second conductor 128, first conductor 126 is at about ground and second conductor 128 is at about 1 volts. By contrast, when there is an electrical connection between first conductor 126 and second conductor 128, second conductor 128 is shorted to ground and, thus, both first conductor 126 and second conductor 128 are at about ground. Control circuitry 120 may detect the state of second conductor 128 toggling between about ground and about 1 volt.

Therefore, in operation, when closure 118 is tightened upon container neck 112, bridge conductor 130 comes into contact with first conductor 126 and second conductor 128 and, thus, provides an electrical connection therebetween. In doing so, control circuitry 120 may detect that second conductor 128 is shorted to ground, which indicates that closure 118 is installed (i.e., container 100 is closed). By contrast, when closure 118 is removed from container neck 112, bridge conductor 130 is not present and, thus, there is no electrical connection between first conductor 126 and second conductor 128. In doing so, control circuitry 120 may detect that second conductor 128 is at about 1 volt, which indicates that closure 118 is not installed (i.e., container 100 is open). As a result, a reliable and inexpensive mechanism is provided by use of the example sensing mechanism 124 of FIGS. 1A and 1B for sensing a container opening/closing event, which automatically triggers the control functions of control circuitry 120 and, in particular, triggers the dose reminder operations thereof, which triggers the various indicators 122 that are used to prompt the user.

Figure 2A:
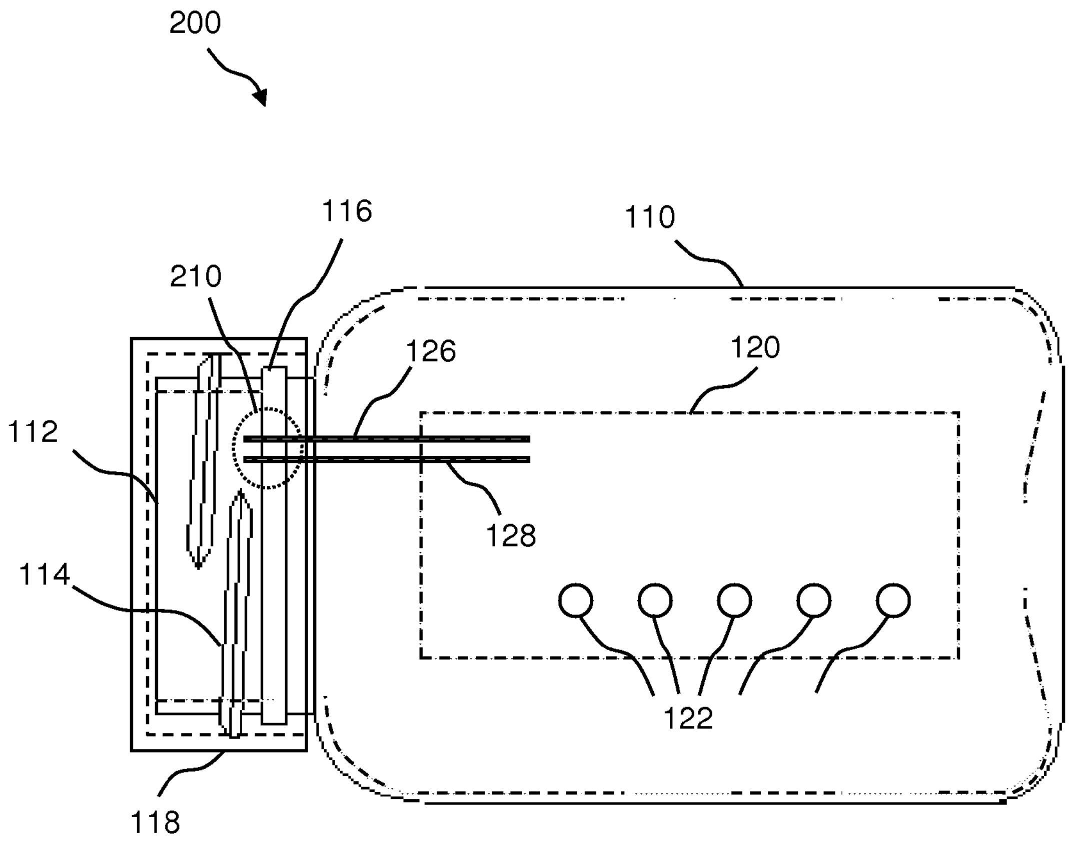
FIG. 2A illustrates a side view of a pharmaceutical container that includes another example of a mechanism for sensing the opening and closing thereof, which triggers an automatic, built-in, electronic dosage reminder operation.

FIG. 2A illustrates a side view of a pharmaceutical container 200 that includes another example of a mechanism for sensing the opening and closing thereof, which triggers an automatic, built-in, electronic dosage reminder operation. Container 200 is, for example, a pharmaceutical container that contains active and passive electrical components for coupling to the sensing mechanism and providing a response thereto. Container 200 is substantially the same as container 100 of FIGS. 1A and 1B, except for the inclusion of sensing mechanism 210 in place of sensing mechanism 124.

Figure 2B:
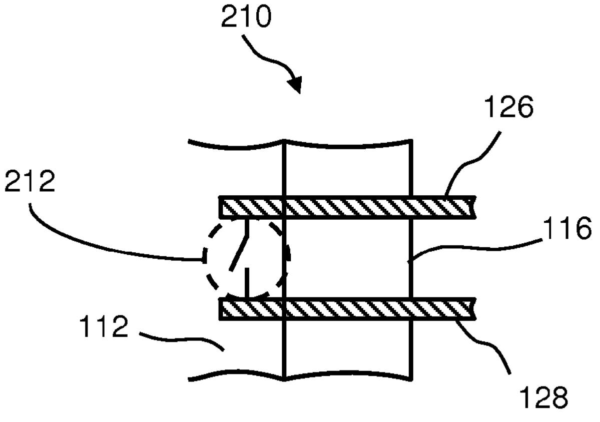
FIG. 2B illustrates a close up side view of the example sensing mechanism of FIG. 2A.

Referring to FIG. 2B, which illustrates a close up side view of the example sensing mechanism 210 of FIG. 2A, sensing mechanism 210 includes first conductor 126 and second conductor 128, as described in FIGS. 1A and 1B. However, the electrical connection between first conductor 126 and second conductor 128 of sensing mechanism 210, which is a function of whether closure 118 is installed or not, is provided via a micro-switch 212. More specifically, micro-switch 212 is integrated into container neck 112 between first conductor 126 and second conductor 128. In one example, micro-switch 212 is a normally-open miniature membrane switch, widely available from such suppliers as Xymox of Milwaukee Wis. (www.xymox.com). The location of micro-switch 212 is such that when closure 118 is tightened upon container neck 112, a thread of closure 118 makes physical contact with the actuator of the normally-open micro-switch 212 in order to close micro-switch 212. Preferably, micro-switch 212 is installed in an inconspicuous manner, such that the user is not prone to tampering therewith.

In operation, when closure 118 is tightened upon container neck 112, micro-switch 212 is closed and control circuitry 120, therefore, detects the presence of closure 118 and that container 100 is closed. By contrast, when closure 118 is not installed upon container neck 112, micro-switch 212 is open and control circuitry 120, therefore, detects the absence of closure 118 and that container 100 is open. As a result, a reliable and inexpensive mechanism is provided by use of the example sensing mechanism 200 of FIGS. 2A and 2B for sensing a container opening/closing event, which automatically triggers the control functions of control circuitry 120 and, in particular, triggers the dose reminder operations thereof, which triggers the various indicators 122 that are used to prompt the user.

Figure 3A:
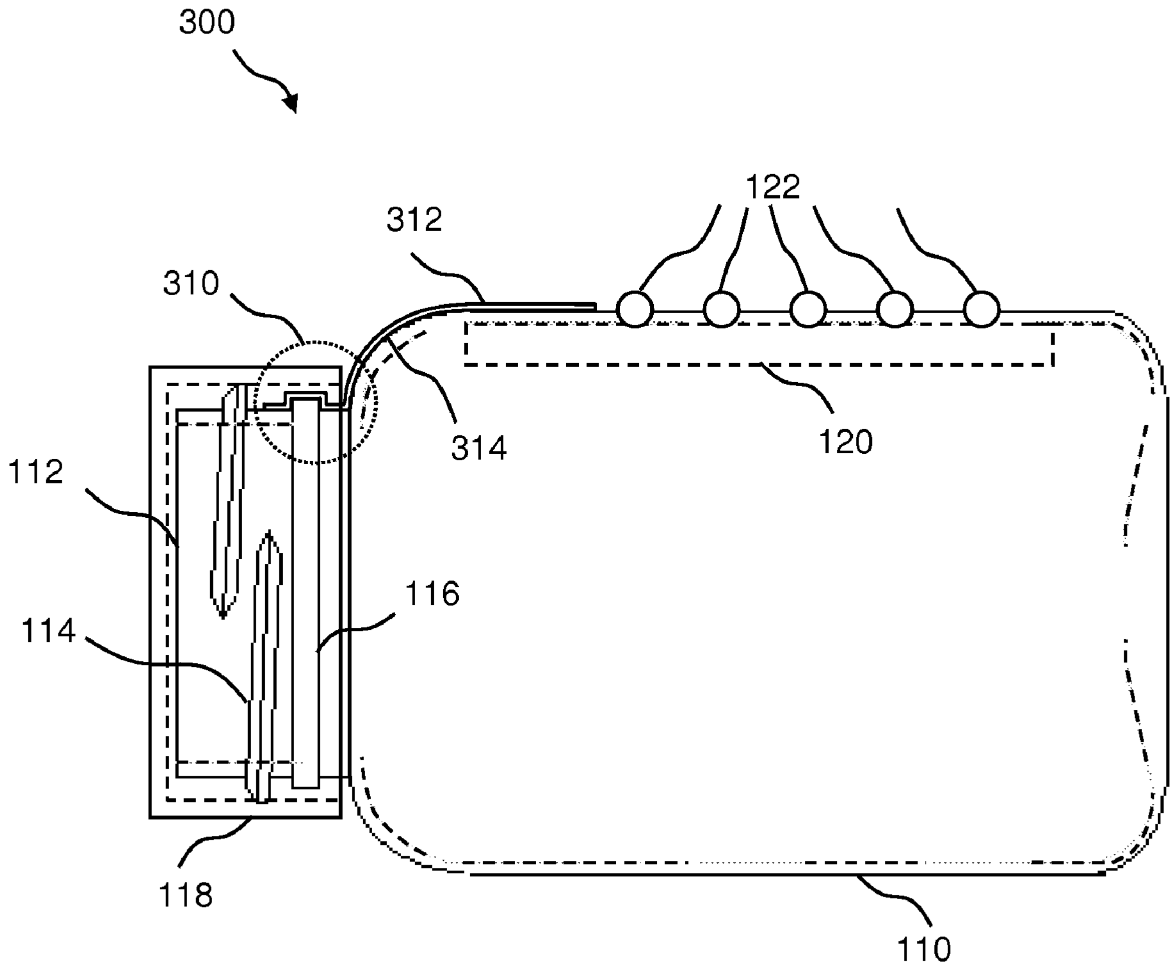
FIG. 3A illustrates a side view of a pharmaceutical container that includes yet another example of a mechanism for sensing the opening and closing thereof, which triggers an automatic, built-in, electronic dosage reminder operation.

FIG. 3A illustrates a side view of a pharmaceutical container 300 that includes yet another example of a mechanism for sensing the opening and closing thereof, which triggers an automatic, built-in, electronic dosage reminder operation. Container 300 is, for example, a pharmaceutical container that contains active and passive electrical components for coupling to the sensing mechanism and providing a response thereto. Container 300 is substantially the same as container 100 of FIGS. 1A and 1B, except for the inclusion of sensing mechanism 310 in place of sensing mechanism 124. Sensing mechanism 310 includes a first conductor 312 and a second conductor 314. More details of sensing mechanism 310 are described in FIGS. 3B and 3C.

Figure 3B:
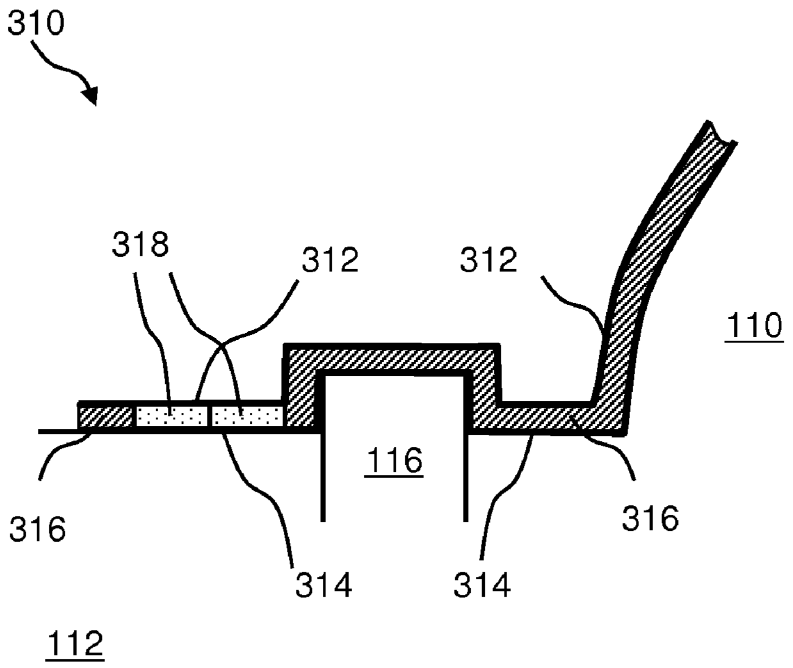
FIG. 3B illustrates a side view of the example sensing mechanism of FIG. 3A in the container open state.

FIG. 3B illustrates a side view of the example sensing mechanism 310 of FIG. 3A in the container open state. FIG. 3B shows that first conductor 312 and second conductor 314 are oriented one atop the other in relation to the outer surface of container body 110 and container neck 112. In one example, first conductor 312 and second conductor 314 may be formed of non-toxic, flexible electrically conductive metal, such as, but not limited to, 3M™ electrically conductive tape from 3M Corporation (St. Paul, Minn.). First conductor 312 and second conductor 314 are separated along a portion of their length by an insulator material 316, which may be, for example, a solid dielectric material, such as, but not limited to, epoxy. Additionally, a compression region of sensing mechanism 310 is formed by, for example, two pieces of flexible insulators 318 that are abutted one to another. Flexible insulators 318 are formed of a compressible insulator material, such as, but not limited to, special conductive tape such as may be available from 3M Corporation (St. Paul, Minn.) or such as may be custom manufactured to application specifications by such suppliers as Creative Materials, in Tyngsboro, Mass. (www.creativematerials.com). The placement of flexible insulators 318 between first conductor 312 and second conductor 314 is in alignment with, for example, one or more threads (not shown) of closure 118, when closure 118 is tightened upon container neck 112. The space between first conductor 312 and second conductor 314 and, thus, the thickness of insulator material 316 and flexible insulators 318 may be a few microns.

Figure 3C:
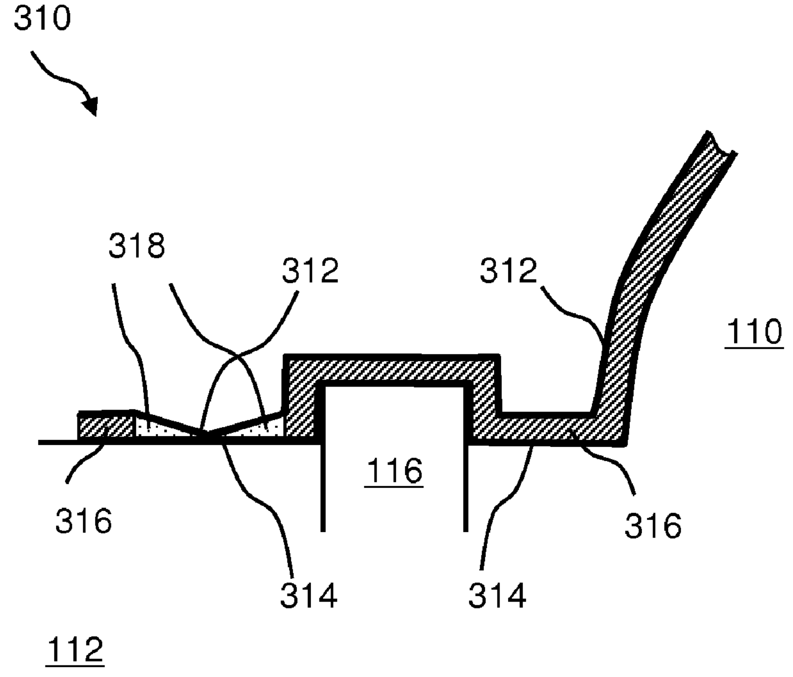
FIG. 3C illustrates a side view of the example sensing mechanism of FIG. 3A in the container closed state.

FIG. 3C illustrates a side view of the example sensing mechanism 310 of FIG. 3A in the container closed state. More specifically, when closure 118 is tightened upon container neck 112, its threads (not shown) apply pressure to flexible insulators 318 (i.e., a compression region) of sensing mechanism 310, which displaces the material of flexible insulators 318 where they abut one another, as shown in FIG. 3C. In doing so, first conductor 312 flexes slightly toward second conductor 314 and makes physical and electrical contact thereto, forming a switch mechanism.

Optionally, the color of first conductor 312 and second conductor 314 may be the same as the color of container 300, in order to be inconspicuous such that the user is not prone to tampering therewith.

In operation and referring again to FIGS. 3A, 3B, and 3C, when closure 118 is tightened upon container neck 112, first conductor 312 flexes slightly toward second conductor 314 and makes physical and electrical contact thereto, as shown in FIG. 3C. Consequently, the switch mechanism is closed and, thus, control circuitry 120 detects the presence of closure 118 and that container 100 is closed. By contrast, when closure 118 is not installed upon container neck 112, second conductor 314 is in its unflexed position, as shown in FIG. 3B, and not making contact with second conductor 314. Consequently, the switch mechanism is open and, thus, control circuitry 120 detects the absence of closure 118 and that container 100 is open. As a result, a reliable and inexpensive mechanism is provided by use of the example sensing mechanism 300 of FIGS. 3A, 3B, and 3C for sensing a container opening/closing event, which automatically triggers the control functions of control circuitry 120 and, in particular, triggers the dose reminder operations thereof, which triggers the various indicators 122 that are used to prompt the user.

Figure 4:
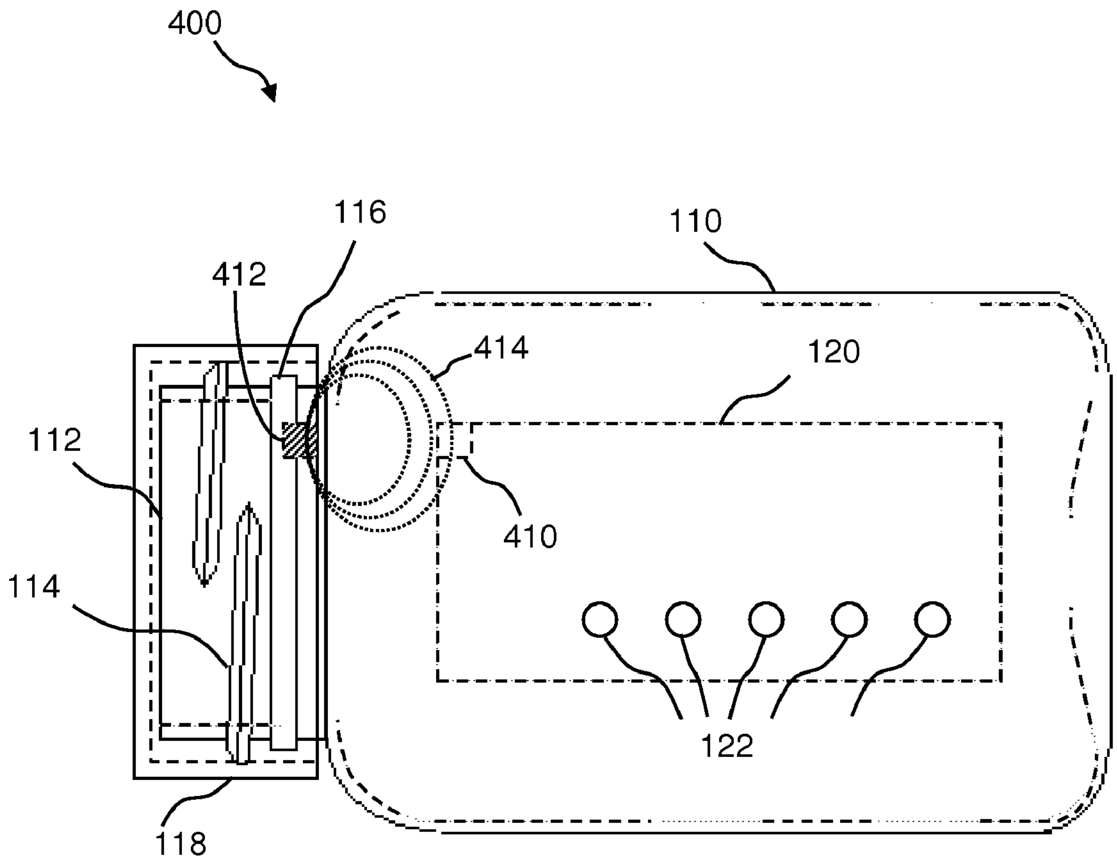
FIG. 4 illustrates a side view of a pharmaceutical container that includes yet another example of a mechanism for sensing the opening and closing thereof, which triggers an automatic, built-in, electronic dosage reminder operation.

FIG. 4 illustrates a side view of a pharmaceutical container 400 that includes yet another example of a mechanism for sensing the opening and closing thereof, which triggers an automatic, built-in, electronic dosage reminder operation. Container 400 is, for example, a pharmaceutical container that contains active and passive electrical components for coupling to the sensing mechanism and providing a response thereto. Container 400 is substantially the same as container 100 of FIGS. 1A and 1B, except for the inclusion of a Hall effect sensor 410 and a magnet 412 in place of sensing mechanism 124. More specifically, magnet 412 is installed within closure 118, preferably at the edge of closure 118 that is closest to container body 110 and in close proximity to Hall effect sensor 410 when closure 118 is tightened.

The Hall effect refers to the potential difference (i.e., Hall voltage) on the opposite sides of an electrical conductor through which an electric current is flowing. The Hall voltage is created by a magnetic field that is applied perpendicular to the current. A Hall effect sensor, such as Hall effect sensor 410, is a type of position sensor that senses magnetic field strength and produces a voltage that changes with this strength. Hall sensors may have digital or analog outputs. In one example, Hall effect sensor 410 may be selected from widely available offerings, such as by Digi-Key Corporation in Thief River Falls, Minn. (www.digikey.com).

In operation, an output voltage of Hall effect sensor 410 is a certain state when closure 118 is tightened upon container neck 112 because Hall effect sensor 410 senses a magnetic field 414 from magnet 412. Consequently, control circuitry 120 detects the presence of closure 118, which indicates that container 100 is closed. By contrast, the output voltage of Hall effect sensor 410 is a certain different state when closure 118 is removed from container neck 112, such as by unscrewing, because Hall effect sensor 410 no longer senses sufficient magnetic field 414 from magnet 412 to register a circuit-closed state. Consequently, control circuitry 120 detects absence of closure 118, which indicates that container 100 is open. The strength of magnetic field 414 of magnet 412 may be optimized for the distance between magnet 412 and Hall effect sensor 410 when closure 118 is in the tightened position upon container neck 112. In one example, magnet 412 is a magnet having a field strength range of several hundred Gauss to several thousand Gauss, depending on the sensitivity of readily available, low-cost Hall effect sensors. Preferably, magnet 412 is a miniature magnet that is installed in an inconspicuous manner in closure 118, such that the user is not prone to tampering therewith.

Additionally, in order to optimize the lifetime of the battery (not shown) of container 400, control circuitry 120 polls the state of Hall effect sensor 410 periodically, such as every 100 milliseconds, instead of continuously.

Referring again to FIG. 4, a reliable mechanism is provided by use of Hall effect sensor 410 and magnet 412 for sensing a container opening/closing event, which automatically triggers the control functions of control circuitry 120 and, in particular, triggers the dose reminder operations thereof, which triggers the various indicators 122 that are used to prompt the user.

The present invention is not limited to prescription medication applications only. Alternatively, the invention may apply to any non-prescription medication application. Additionally, the present invention is not limited to pharmaceutical applications only. Alternatively, the invention may apply to any product dispensing application within which it is beneficial to improve the dispensing regimen or usage of a product in a container. In one example, in a paint or urethane container application, it is beneficial to issue a reminder that sufficient time has passed to apply a second coat of paint or urethane. In another example, in a glue container application, it is beneficial to issue a reminder that sufficient time has passed for the glue to set, which indicates that the glued item may be ready to use. In yet another example, wound-dressing regimens require strict observance in order to maximize infection prevention. In yet another example, sunscreen packages may remind parents users when to reapply sunscreen, given its finite life once applied.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person skilled in the art are intended to be included within the scope of the disclosure as defined by the accompanying claims.

What is claimed is:

1. A system for sensing the opening and closing of a pharmaceutical container, the system comprising:

a pharmaceutical container, comprising:

a container body;

a container neck disposed at one end of the container body;

container threads disposed on the container neck;

a container closure removably attached to the container neck via the container threads;

control circuitry attached to the external surface of the container and integrated with the container body;

indicators, comprising a plurality of light emitting diodes (LEDs) connected to the control circuitry, attached to the external surface of the container and integrated with the container body, comprising a first indicator, a second indicator, a third indicator, and a fourth indicator, wherein the first indicator represents a LED for prompting a user to install the closure upon pharmaceutical container, the second indicator represents a LED for indicating that current state of a dosing regimen is satisfactory, the third indicator represents a LED for indicating to the user that a dose has been missed, and the fourth indicator represents a LED for indicating to the user that it is time to consume his/her prescribed dose of medication;

and an automatic sensing mechanism integrated within the pharmaceutical container body.

2. The system of claim 1, wherein the control circuitry is installed in a well formation that is provided in the outside of the container body, such that the control circuitry is not in direct contact with the contents inside of the container body.

3. The system of claim 1, wherein the control circuitry provides control for the automatic sensing mechanism.

4. The system of claim 1, wherein the control circuitry provides a control means and storage means for managing the automatic sensing mechanism.

5. The system of claim 1, wherein the automatic sensing mechanism, comprises a Hall effect sensor disposed on the outside of the container body; and a magnet disposed on an edge of the container closure such that it is in close proximity to the Hall effect sensor when the container closure is tightened to the closed position, wherein, an output voltage of the Hall effect sensor is at certain states based on the presence or absence of a magnetic field generated from the magnet and thus detects the presence or absence of container closure, thus providing a switch function for sensing the presence or absence of the container closure by detecting when a magnetic field is present or absent.

6. A system for sensing the opening and closing of a pharmaceutical container, comprising:

a pharmaceutical container, comprising:

a container body;

a container neck disposed at one end of the container body;

container threads disposed on the container neck;

a container closure removably attached to the container neck via the container threads:

control circuitry attached to the external surface of the container and integrated with the container body;

indicators attached to the external surface of the container and integrated with the container body; and an automatic sensing mechanism integrated within the pharmaceutical container body, comprising:

a first conductor disposed along the outside of the container body;

a second conductor disposed along the outside of the container body;

a first end of the first and second conductors is electrically connected to the control circuitry and a second end of the first and second conductors is disposed at the container neck; and a bridge conductor disposed on the inside of the container closure, wherein the bridge conductor provides an electrical connection between the first conductor and second conductor when the container closure is attached to the container neck, and wherein the first conductor, second conductor, and bridge conductor provide a switch function for sensing the presence or absence of the container closure by detecting when an electrical connection exists or not between the first conductor and second conductor via the bridge conductor.

7. The mechanism of claim 6, wherein the first conductor and the second conductor extend parallel to one another and are spaced a defined distance apart along the perimeter of the container neck.

8. The mechanism of claim 6, wherein the bridge conductor is provided on a thread on the inside of the container closure.

9. A system for sensing the opening and closing of a pharmaceutical container, comprising:

a pharmaceutical container, comprising:

a container body;

a container neck disposed at one end of the container body;

container threads disposed on the container neck;

a container closure removably attached to the container neck via the container threads:

control circuitry attached to the external surface of the container and integrated with the container body;

indicators attached to the external surface of the container and integrated with the container body; and an automatic sensing mechanism integrated within the pharmaceutical container body, comprising:

a first conductor disposed along the outside of the container body;

a second conductor disposed along the outside of the container body;

a first end of the first and second conductors is electrically connected to the control circuitry and a second end of the first and second conductors is disposed at the container neck; and a micro-switch integrated into the container neck between the first conductor and the second conductor, wherein the location of the micro-switch on the container neck is such that when the container closure is tightened upon the container neck a thread of the container closure makes physical contact with an actuator of the micro-switch to close the micro-switch thus providing an electrical connection between the first conductor and second conductor when the container closure is attached to the container neck, and wherein the first conductor, second conductor, and micro-switch provide a switch function for sensing the presence or absence of the container closure by detecting when an electrical connection exists or not between the first conductor and second conductor via the micro-switch.

10. A system for sensing the opening and closing of a pharmaceutical container, the system comprising:

a pharmaceutical container, comprising:

a container body;

a container neck disposed at one end of the container body;

container threads disposed on the container neck;

a container closure removably attached to the container neck via the container threads:

control circuitry attached to the external surface of the container and integrated with the container body;

indicators attached to the external surface of the container and integrated with the container body;

an automatic sensing mechanism integrated within the pharmaceutical container body, comprising:

a first conductor disposed along the outside of the container body;

a second conductor disposed along the outside of the container body;

a first end of the first and second conductors is electrically connected to the control circuitry and a second end of the first and second conductors is disposed at the container neck; and a compression region formed by flexible insulator materials that are abutted one to another and disposed between the first conductor and second conductor, wherein the placement of the flexible insulator material is in alignment with one or more threads of the container closure when the container closure is tightened upon the container neck, and wherein when the container closure is tightened upon the container, its threads apply pressure to the compression region which displaces the flexible insulator material where they abut one another thus causing the first conductor to flex toward the second conductor and make electrical contact thereto, forming a switch function for sensing the presence or absence of the container closure by detecting when an electrical connection exists or not between the first conductor and second conductor.

* * * * *